3,226,913
SEPARATION PROCESS
William F. Avery, Buffalo, N.Y., assignor to Union
Carbide Corporation, a corporation of New York
Filed Sept. 4, 1963, Ser. No. 307,766
20 Claims. (Cl. 55—25)

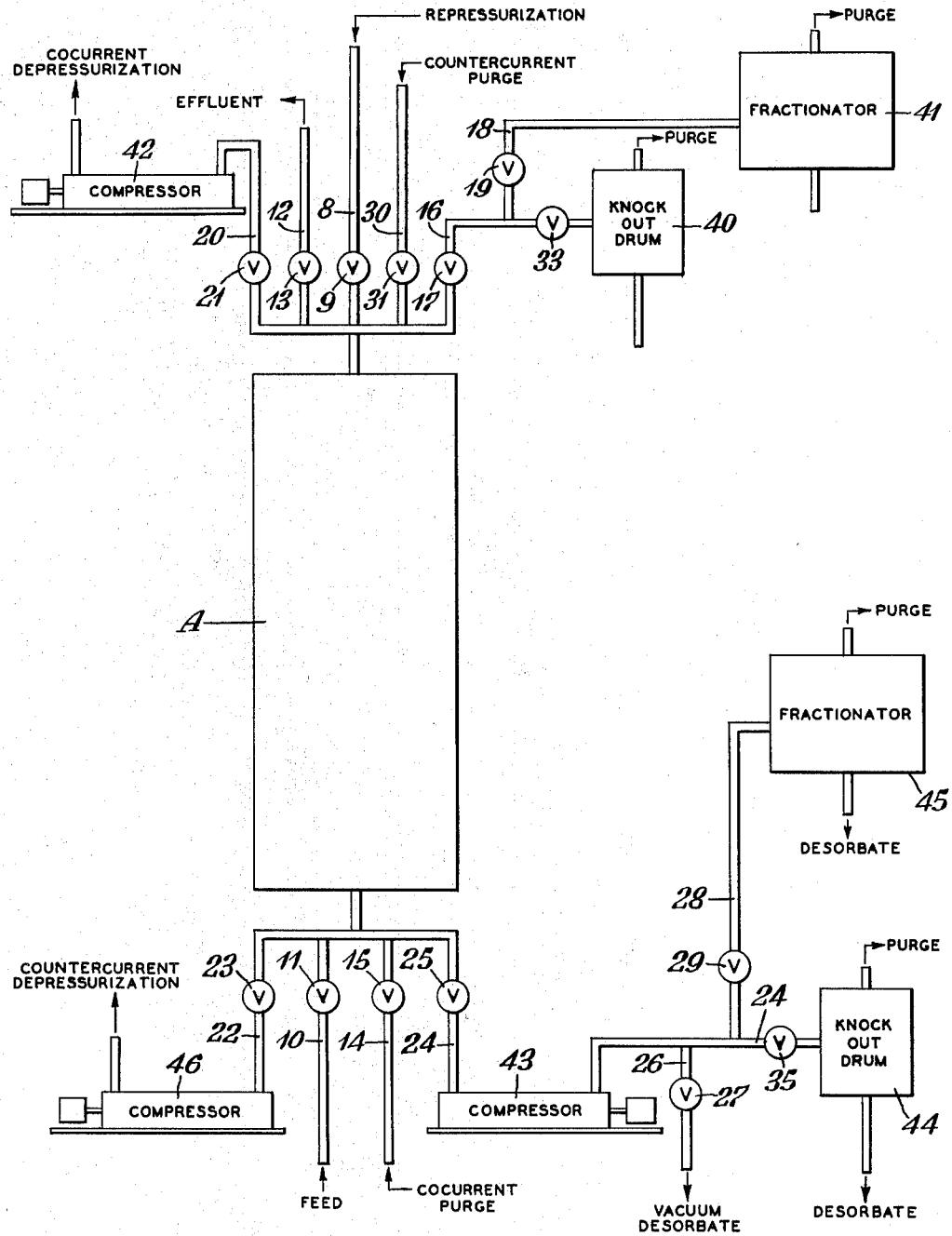

This is a continuation-in-part of Serial No. 221,002, filed September 4, 1962, in the name of W. F. Avery, and now abandoned.

This invention relates to an improved process for increasing the purity of a desorbate stream in a molecular sieve separation system. More particularly, this invention relates to an improved process for increasing the recovery of substantially pure normal hydrocarbons from hydrocarbon feed streams having end points up to about 700° F.

It is well known that zeolitic molecular sieves are capable of separating mixtures into components of different characteristics. For example, zeolitic molecular sieves are able to separate mixtures based on the sizes of the molecules comprising the mixtures. Initially, molecular sieve processes were used to separate small amounts of impurities from feed streams. The impurities were those capable of being strongly adsorbed such as water, sulphur compounds and carbon oxides. The standard technique was to pass the feed stream containing the impurities through a bed of molecular sieves thereby removing the impurities from the stream by adsorption on the molecular sieves and thereby discharging an impurities depleted stream from the effluent end of the bed. The feed stream was continuously charged to the bed until impurity breakthrough, i.e., when the sieve bed was substantially saturated with impurity. Then, the feed stream was charged to another bed and the saturated bed desorbed by the usual techniques. Although such a process effectively removed the impurities from the feed stream, some of the desired product stream was lost during the desorption step.

Later techniques of molecular sieve adsorption have shown that some of the non-adsorbable component of the feed stream lost during the desorption step could be recovered by interposing a cocurrent depressurization step between the adsorption and desorption steps and not continuing the adsorption step to breakthrough. Thus, during the cocurrent depressurization step, the entrapped non-adsorbable component in the non-sorbing sections of the molecular sieve bed are recovered through the effluent end of the bed. By not continuing the adsorption step to breakthrough, a non-saturated molecular sieve section is provided at the effluent end of the bed to recover the adsorbable component of the stream passing therethrough during the cocurrent depressurization step. For many separation processes, this technique leaves the bed containing substantially only the adsorbed component of the feed stream after cocurrent depressurization. Therefore, this technique provided a process for separating the feed stream into two relatively pure streams, the non-adsorbed stream leaving the bed during adsorption and cocurrent depressurization and the adsorbed stream leaving the bed during desorption.

Although this technique has been quite successful in separating the feed stream into two relatively pure components, it has been discovered that certain feed mixtures cannot be efficiently separated by such process steps. It has been found that for these particular mixtures, even if the cocurrent depressurization step is continued until adsorbed component breakthrough, a substantial amount of the non-adsorbed component of the feed stream remains in the bed. Thus, a relatively pure adsorbed component stream cannot be recovered during the desorption step. An illustration is naphtha feedstocks containing $C_{10}$ through $C_{22}$ normal paraffins and non-paraffins such as aromatics. The paraffins are preferentially internally adsorbed by molecular sieves but unfortunately the aromatics tend to surface contaminate the sorbent. Many molecular sieve separation processes directed toward the recovery of the adsorbed component of the feed stream as the desired product have not been commercially practical because of the inability to yield a satisfactorily pure desorbate stream.

It is believed that contamination of the desorbate is due to some or all of the following phenomena: (1) external sorption on the surfaces of the molecular sieves, (2) sorption on the binder material, and (3) capillary condensation. Zeolitic molecular sieves are produced as fine powders. For use in adsorbent beds, the fine powders are agglomerated with a binder material, such as clay. Because of the nature of this agglomerated fine powder molecular sieve pellet, it has been found that certain non-adsorbable molecules are nevertheless tenaciously held during adsorption.

It is an object of the present invention to provide a process for improving the purity of the desorbate stream of a molecular sieve separation process. Another object is to improve the purity of a normal paraffin desorbate separated from a naphtha feedstock with molecular sieves.

Other objects and advantages of the present invention will be apparent from the ensuing description and accompanying drawing.

In accordance with the present invention, a process is provided for the separation of a feed gas stream containing molecules capable of being internally adsorbed in a bed of zeolitic molecular sieves. The feed gas also contains other molecules which remain non-internally sorbed. The feed gas stream is contacted with the bed at a first higher pressure and an effluent gas stream essentially free of the molecules capable of being internally adsorbed is discharged from the bed at the first higher pressure. The feed gas-molecular sieve contact is continued until the leading adsorption front reaches a predetermined location at least partially within the bed. That is, the adsorbent bed is only partially loaded and the adsorption step is terminated short of saturation. The purity of the desorbate gas stream is materially improved by passing a purge gas stream of an easily removable gas through the bed after the adsorption step in the same direction as the feed gas stream. By passing the purge stream cocurrently through the bed the non-internally sorbed molecules are removed through the effluent end of the bed. The purge gas stream is passed through the bed at substantially adsorption bed temperature and a pressure at least equal to the sum of the partial pressures of the feed components which are internally adsorbable in the molecular sieve. Purge gas flow is continued at least until the purge gas in the effluent stream from the other end of the bed is at least 5 volume percent of the effluent. However, purge flow is terminated before 8 bed volumes after the purge gas has reached equilibrium.

This equilibrium point is hereinafter defined. After the cocurrent purge gas stream is passed through the bed, the bed is depressurized to a second lower pressure so as to remove essentially only the non-adsorbed molecules and a portion of the easily removable purge gas stream. The recovery of a substantially pure gas stream of the internally adsorbed component of the feed gas stream is then accomplished by further depressurizing the bed to a third lowest pressure.

Certain adsorbents which selectively adsorb molecules on the basis of size and shape of the adsorbate molecule are referred to as molecular sieves. Zeolites are metal aluminosilicates which exist in crystalline form. Only the crystalline zeolites having the basic formula:

$$M_{2/n}O:Al_2O_3:xSiO_2:yH_2O$$

where "M" represents an exchangeable cation and "n" its valence, are termed zeolitic molecular sieves. In general, a particular crystalline zeolite will have values for "x" and "y" that fall within a definite range.

The fundamental "building block" of any zeolite crystal is a tetrahedron of four oxygen ions surrounding a smaller silicon or aluminum ion. Each of the oxygen ions has two negative charges; each silicon ion has four positive charges; each aluminum ion, three. A silicon thus takes on a "half interest" in the eight charges of the four oxygens which surround it. Each oxygen retains one negative charge which enables it to combine with another silicon or aluminum ion and extend the crystal lattice in all directions. The aluminum ion, with one less positive charge than the silicon, can only satisfy three negative charges of the four oxygen atoms which surround it. To produce a stable crystal structure, it must have the help of another positively charged ion. This is the function of the exchangeable cation "M."

The structure of most crystals extends uniformly in all directions without leaving empty spaces. In zeolitic molecular sieves, however, the framework of silicon-oxygen and aluminum-oxygen tetrahedra forms a structure which is honeycombed with relatively large cavities which are normally filled with water molecules. The size and shape of these cavities depends on the variety of the zeolite.

The zeolitic molecular sieves as described above may be activated by heating to effect the loss of the water of hydration. The dehydration results in crystals interlaced with channels of molecular dimensions that offer very high surface areas for the adsorption of foreign molecules.

Adsorption by molecular sieves is limited to molecules having size and shape such as to permit entrance through the pores which connect to the inner sorption areas or cavities, all other molecules being excluded.

The zeolites occur as agglomerates of fine crystals or are synthesized as fine powders and are preferably tableted or pelletized for large-scale adsorption uses. Pelletizing methods are known which are very satisfactory because the adsorptive character of the zeolite, both with regard to selectivity and capacity, remains essentially unchanged.

Among the zeolitic molecular sieves suitable for use in the present invention are the naturally occurring materials known as chabazite, erionite, mordenite, faujasite, and their synthetic and modified counterparts. The natural materials are adequately described in the chemical art. Other suitable synthetic zeolitic molecular sieves include zeolites A, D, R, S, T, X, Y and L.

The pore size of the zeolitic molecular sieves may be varied by employing different metal cations. For example, sodium zeolite A has a pore size of about 4 Angstrom units whereas when calcium cations have been exchanged for at least about 40 percent of the sodium cations calcium zeolite A has a pore size of about 5 Angstrom units.

Zeolite A is a crystalline zeolitic molecular sieve which may be represented by the formula:

$$1.0 \pm 0.2 M_{2/n}O : Al_2O_3 : 1.85 \pm 0.5 SiO_2 : yH_2O$$

wherein M represents a cation, n is the valence of M, and y may have any value up to about 6. The as-synthesized zeolite A contains primarily sodium cations and is designated sodium zeolite A, which is described in more detail in U.S. Patent No. 2,882,243, issued April 14, 1959.

Zeolite T is a synthetic crystalline zeolitic molecular sieve whose composition may be expressed in terms of oxide mole ratio as follows:

$$1.1 \pm 0.4[xNa_2O:(1-x)K_2O]:Al_2O_3:6.9 \pm 0.5 SiO_2 : yH_2O$$

wherein "x" is any value from about 0.1 to about 0.8 and "y" is any value from about zero to about 8. Further characterization of zeolite T by means of X-ray diffraction techniques is described in U.S. Patent No. 2,950,952, issued August 30, 1960.

Zeolite X is a synthetic crystalline zeolitic molecular sieve which may be represented by the formula:

$$0.9 \pm 0.2 M_{2/n}O : Al_2O_3 : 2.5 \pm 0.5 SiO_2 : yH_2O$$

wherein M represents a cation, particularly alkali and alkaline earth metal cations, n is the valence of M, and y may have any value up to about 8, depending on the identity of M and the degree of hydration of the crystalline zeolite. Sodium zeolite X has an apparent pore size of about 10 Angstrom units. Zeolite X, its X-ray diffraction pattern, its properties, and methods for its preparation are described in detail in U.S. Patent No. 2,882,244, issued April 14, 1959.

Zeolite Y is described and claimed in U.S. patent application Serial No. 109,487, filed May 12, 1961, now Patent No. 3,130,007, issued April 21, 1964.

Zeolite L is described and claimed in U.S. patent application Serial No. 711,565, filed January 28, 1958, in the name of D. W. Breck and N. A. Acara, now abandoned.

Zeolite D is described and claimed in U.S. patent application Serial No. 680,383, filed August 26, 1957, in the name of D. W. Breck and N. A. Acara, now abandoned.

Zeolite R is described and claimed in U.S. Patent No. 3,030,181, issued April 17, 1962.

The nature and objects of the present invention will be more readily understood by reference to a specific separation. In particular, the invention will be described in terms of the recovery of straight chain hydrocarbons from branch chain and cyclic hydrocarbons of feed gas streams having end points up to about 700° F. Such feed streams comprise hydrocarbons in the $C_8$–$C_{22}$ range. A typical stream of this end point may contain from about 10 to 40 percent of normal paraffin hydrocarbons with the remaining material consisting primarily of cyclic and branch chain hydrocarbons. A zeolitic molecular sieve having a pore size of about 5 A., such as calcium zeolite A, will internally adsorb only the normal paraffins of such a feed gas stream.

Referring now to the drawing, the feed gas stream is heated to a temperature in the range of 600°–850° F. and at a pressure of about 15 to 150 p.s.i.a. and passed to adsorption zone A containing a bed of zeolitic molecular sieves having a pore size of about 5 A. by opening valve 11 in conduit 10. The temperature for this feed stream should be above about 600° F. to maintain the feed in a vapor phase and below about 850° F. to prevent substantial cracking of the feed stream and concomitant degradation of the sieving action of the adsorbent. Furthermore, it has been found that the higher temperatures are preferred. Although this would seem to be an undesirable procedure since molecular sieves are known to have lower adsorbate capacities at higher temperatures, it has been found that the delta loading (ΔL), that is, the difference in normal paraffin adsorbate capacity of the molecular sieve between adsorption and desorption conditions is substantially the same at higher temperatures. Most importantly, the amount of carbonaceous matter accumulating in the bed is materially reduced in the above defined relatively high temperature range.

Valve 13 in conduit 12 is also open during the adsorption step thereby permitting recovery of the non-adsorbed components of the feed gas stream. As the feed gas stream is continuously fed through conduit 10 to the bed, the normal paraffins saturate the inlet end of the bed. This forms an adsorption front which progressively moves toward the other end of the bed as the feed moves through the bed. As the adsorption front moves through the bed, a portion of the non-internally adsorbed molecules, that is, the cyclic and branch chain hydrocarbons, are recovered through conduit 12 as the effluent gas stream. The adsorption front will consist of many individual fronts, each due to the particuler molecule's adsorptivity on the molecular sieve. For normal paraffins, the molecules containing the lowest number of carbon atoms will be least strongly adsorbed and thus such molecules will be the leading front in the bed. After a predetermined time, that is, when this leading adsorption front has reached a predetermined point within the bed, the feed gas stream is terminated by closing valves 11 and 13.

After this adsorption step, it is preferred to pass a concurrent purge gas stream of an easily removable gas through the bed. As used herein, the term "easily removable gas" means a gas which can meet both of the following requirements. The gas must be less strongly internally adsorbed than the most strongly adsorbed molecules of the internally adsorbed component of the feed gas stream and it should be capable of being readily separated from the effluent streams of the bed, such as by distillation.

The first requirement is necessary to prevent the cocurrent purge gas stream from desorbing the desired internally adsorbed product by displacement during its passage through the bed. The second requirement is necessary so that the purge gas can be readily recovered from the various effluent streams and recycled to another or the same bed for another cocurrent purge step.

The purge gas may be either internally adsorbable or non-internally adsorbable on the molecular sieves, the former being preferred. It has been found that the heavier gases provide a more effective purge gas than lighter ones. For example, pentane has been found more effective than methane. Among the purge streams contemplated by the present invention are methane, n-pentane, i-pentane, n-hexane and i-hexane. Alternatively, a light fraction of the feed normal paraffins may comprise the purge gas, i.e, that fraction of the feed normal paraffins which is less strongly adsorbed than the "key normal paraffin." The key normal paraffin is herein defined as the lowest molecular weight normal paraffin which is present as at least 10 mol percent of the normal paraffin part of the feed.

It is particularly desirable in the present invention to use a gas which is capable of being internally adsorbed by the molecular sieve. Such a gas stream has been found to very effectively remove the non-internally sorbed molecules remaining in the bed and the feed gas remaining in the non-selective areas of the bed after adsorption. Also, an adsorbable purge gas is relatively free of non-adsorbable branched-chain and cyclic hydrocarbons, and since some of the purge remains in the bed and appears in the desorbate effluent, contamination of the normals product with the isomer impurities is avoided. The preferred purge gases are normal paraffins having at least four carbon atoms per molecule, as for example butane, pentane and hexane. These compounds are superior to lighter aliphatics and materials such as nitrogen and hydrogen because they are more strongly adsorbed on the molecular sieve surface and consequently displace the surface-adsorbed contaminants more readily. As used herein, the term "non-internally sorbed molecules" means that component of the feed gas stream which cannot be internally adsorbed by the molecular sieve crystals but nevertheless is somehow tenaciously held by the bed (external surfaces, binder, etc.). It has been found, for example, that the heavier aromatic content of the feed gas stream is tenaciously held by the bed during adsorption.

The concurrent purge gas stream is passed through the bed by opening valves 15 and 17 in conduits 14 and 16, respectively. The purge gas stream should be passed through the bed at substantially the adsorption step temperature and at a pressure at least equal to the sum of the partial pressure of the internally adsorbable feed components. Cocurrent flow is necessary to sweep out the void space gas which contains the highest concentration of non-adsorbable components at the other or effluent end of the bed. Also, the cocurrent purge gas is preferably an adsorbable hydrocarbon such as n-pentane or n-hexane, so that some of the purge gas will be adsorbed in the molecular sieve in the zone near the effluent end. Then in the later steps of preferred countercurrent desorption, the adsorbed purge gas is desorbed and sweeps through the bed thereby improving the desorption of the feed normal hydrocarbons.

One advantage of employing preferably substantially the same pressure for cocurrent purging as for adsorption instead of a lower presure is that the purge desorption of adsorbed normals is minimized. Also, the higher pressure cocurrent purge particularly advantageous when an adsorbable fluid is employed, as greater adsorption loadings of the purge gas attained thereby improving the previously described sweeping effect during the succeeding depressurization steps. Other advantages of substantially isothermal or adiabatic adsorption-purging operation include avoidance of irreversible heat losses and minimizing power costs.

As the purge gas passes through the bed, it pushes the material in the non-selective areas or voids of the bed and the non-internally sorbed molecules toward the other end of the bed. The purge gas stream is continued at least until the purge gas concentration in the effluent gas stream in conduit 16 is 5 volume percent of the effluent. Some desorption of the internally adsorbed component of the feed gas will occur because of the stripping action of the purge. However, this desorbed gas will be readsorbed in the other or exit end of the bed since the leading adsorption front was stopped at a predetermined point within the bed during adsorption thus leaving an unsaturated zone of molecular sieve. Thus, the leading adsorption front will move further through the bed towards the other end during the cocurrent purge.

As indicated above, the cocurrent purge flow should continue at least until the concentration of the purge in the effluent is 5 volume percent of the effluent. Stated in another manner, the partial pressure of the purge in the effluent is 5% of the total system pressure. This may be termed purge breakthrough. If less purge is used, the amount of non-adsorbables removed from the bed is not significant. For best results the cocurrent purge flow should be continued at least until the purge gas appears in the effluent at substantially the same partial pressure as it is fed into the inlet end. When this dynamic equilibrium condition is realized most of the non-adsorbables will have been removed and the effluent end of the bed will have been subjected to the full effect of the purge. This point is conveniently determined by measuring the temperature near or at the effluent end of the bed, and continuing the cocurrent purge beyond breakthrough until the effluent temperature has become substantially constant. A temperature rise will be noted approximately at breakthrough and will continue until the bed has reached substantial equilibrium with the purge gas, at which point the temperature will level off or begin decreasing. The temperature rise is due to the heat of adsorption of the purge gas. There is no appreciable adsorption of the purge prior to breakthrough because the latter is serving to sweep out the void space gas. Adsorption continues after breakthrough and until equilibrium is reached.

The cocurrent purge gas flow should not be continued beyond eight bed volumes after the previously described equilibrium condition has been reached. As used herein, the term "bed volume" is the quantity of purge gas which would be contained in the empty, unpacked absorbent chamber at the purge temperature and pressure. This broad upper limit for the cocurrent purge gas flow is based on avoiding excessive forward movement of the adsorbed heavy n-paraffins. That is, an excessive amount of cocurrent purge gas flow will tend to desorb the n-paraffins and push them out of the bed as lost product. As an optimum balance between increasing removal of non-adsorbables on one hand and excessive forward movement of the adsorbate on the other end, the cocurrent purge gas flow should be terminated at least by the point of four bed volumes after equilibrium.

The effluent stream from the bed during the cocurrent purge step passes through conduit 16 and valve 17. The purge gas component of this stream can be recovered by either the knock out drum 40 or the fractionator 41 by opening either valve 33 or 19. The recovered purge may then be recycled to another or the same bed.

After the cocurrent purge, the bed is depressurized and desorbed at least in two steps, initially to a second lower pressure (preferably atmospheric) and finally to a third lowest pressure (preferably sub-atmospheric). By depressurizing the bed in multiple steps, most of the purge gas and any non-adsorbable component of the feed gas stream remaining in the bed can be removed during the initial depressurization.

The initial depressurization can be either cocurrent or countercurrent. If the depressurization is cocurrent, then the leading adsorption front must be adjusted during adsorption to prevent a substantial amount of breakthrough of the desired normal paraffins during this cocurrent depressurization step.

It is preferred, however, to countercurrently depressurize the bed after having left a portion of the purge gas in the upper effluent end of the bed during the cocurrent purge step. Thus, if the purge gas flow is continued until the purge adsorption front is removed but not till the leading adsorption front breakthrough, the purge gas remaining in the bed during the initial countercurrent depressurization will sweep through the bed thus assisting in cleaning up any remaining non-internally adsorbable molecules in the bed. Generally, the composition of the effluent from this step will be more pure with respect to the ratio of feed non-normals to feed normals than the original feed. These may, after separation from the purge, be combined with the desorbate product subsequently obtained or may be otherwise handled, for example, by recycle to the feed.

The cocurrent depressurization is accomplished by opening valve 21 in conduit 20 or the countercurrent depressurization by opening valve 23 in conduit 22. The recovered stream can then be cycled to a fractionator or other such equipment to separate the purge gas for recycling.

After the initial depressurization to remove most of the purge gas and non-internally adsorbable molecules, the bed is further depressurized to desorb the internally adsorbed component of the feed gas by opening valve 25 in conduit 24 and operating compressor 43. The final depressurization step may be either cocurrent or countercurrent, the latter being preferred and illustrated. By using countercurrent flow the lighter, less strongly adsorbed normal paraffins are first desorbed near the effluent end of the bed and flow downwardly serving to sweep out and increase the desorption rate of the more strongly held heavier normal paraffins. The normal paraffins can then be recovered as a pure stream by opening valves 29 and 35 in conduits 28 and 24, respectively, to pass the desorbate gas to knock out drum 44 or fractionator 45 to remove the purge gas component.

In a preferred embodiment of the present invention, countercurrent purge gas stream is passed through the bed at about the adsorption temperature after the final depressurization and at the third lowest pressure to further enhance the desorption step by opening valve 31 in conduit 30. This purge gas may be either adsorbable or non-adsorbable, but relatively heavy adsorbable molecules such as n-pentane and n-hexane are preferred in that they provide a displacement effect. It is also preferable but not essential to use the same molecule as the cocurrent purging medium at the first higher pressure and the third lowest pressure. This eliminates the necessity for processing two purge gases and simplifies equipment and controls. This final purge is at substantially the same temperature as the adsorption step, thereby minimizing heat losses and power costs. The normal paraffins content of this effluent stream may also be recovered as a pure stream in knock out drum 44 or fractionator 45. It has been found that the ΔL can be materially increased by using a purge gas at this lowest pressure of the cycle.

Countercurrent purging at the lowest pressure level, e.g. vacuum pressure, is employed because the heaviest (highest molecular weight) hydrocarbons adsorbed are more concentrated near the one or feed end. By employing countercurrent flow they are subjected to the purging influence of both the purge gas itself plus that of the lighter hydrocarbons desorbed from the other end of the bed. Also, by purging at the lowest pressure level the rate of desorption of the feed normals is improved and the melocular sieve is completely desorbed in a reasonable period of time. A complete desorption brings two benefits, namely, (1) the working loading of the adsorbent is improved, and (2) the quantity of hydrocarbons adsorbed in the most active sorption sites in the molecular sieve is reduced thereby minimizing the buildup of carbonaceous residues that lead to deactivation of the adsorbent.

The quantity of countercurrent purge should be within a $\lambda/\pi$ value of 0.005 and 0.25 where $\lambda$=mols purge/100 lbs. molecular sieve adsorbent, and $\pi$=pressure (p.s.i.a.) at which the purging is carried out. A $\lambda/\pi$ value below 0.005 does not remove an appreciable amount of the remaining adsorbed n-paraffins, whereas a ratio above 0.25 results in so much purge that the yield of heavy n-paraffin adsorbate per mole of purge becomes very small. For best results the quantity of countercurrent purge should be within a $\lambda/\pi$ range of 0.01 and 0.1.

After purging the bed is countercurrently repressurized to adsorption conditions (temperature and pressure) as by passing a portion of the effluent stream from a previous adsorption step through valve 9 in conduit 8. Thus, materials such as branched chain butane, pentane, hexane or heptane may be used for countercurrent repressurization. Alternatively countercurrent repressurization may be with an externally supplied non-adsorbable gas such as nitrogen. Also, repressurization may be partly done, (e.g., up to 1 atmosphere pressure) countercurrently with the above described non-adsorbable materials, and then full repressurization to the adsorption pressure may be completed with the feed stream cocurrently through the one or inlet end of the bed. The bed should not be initially repressurized countercurrently with the feedstock, as this would deposit the adsorbate at the effluent end.

EXAMPLE I

To illustrate the advantages of the present invention, a feed gas stream was passed through a column containing a bed of molecular sieves first using an adsorption-desorption cycle without cocurrent purging, and then utilizing the novel features herein presented. The feed gas stream had an end point of 525° F. and the following composition:

| Composition: | Vol. percent |
|---|---|
| n-$C_8$ | 0.1 |
| n-$C_9$ | 0.1 |
| n-$C_{10}$ | 1.1 |
| n-$C_{11}$ | 6.5 |
| n-$C_{12}$ | 7.5 |
| n-$C_{13}$ | 6.7 |
| n-$C_{14}$ | 6.7 |
| n-$C_{15}$ | 6.0 |
| n-$C_{16}$ | 0.6 |
| n-$C_{17}$ | 0.04 |
| Aromatic hydrocarbons | 11.50 |
| Cyclic and branched chain hydrocarbons (excluding aromatic) | 53.16 |

The column had a 1.6 inch inside diameter and was 61.5 inches high. It was packed with about 1130 grams of Linde Type 5A ⅛" zeolitic molecular sieve pellets. Linde Type 5A pellets are sold by the Linde Company, New York, New York.

The feed gas stream, at a temperature of 707° F. and a pressure of 35 p.s.i.g. was passed upwardly through the bed of molecular sieves. An effluent gas stream was recovered from the other end of the bed and contained the non-internally adsorbed molecules of the feed, i.e., the non normal hydrocarbons. After 2 minutes and 5 seconds, the feed gas stream entering the column was stopped.

The bed was then countercurrently depressurized down to 1 atmosphere in 1 minute. The bed was held at this pressure for 10 seconds. Desorption was then finally accomplished by countercurrently depressurizing the bed to 22 mm. Hg. This step was accomplished in 5 minutes.

The bed was then repressurized to 35 p.s.i.g. by passing countercurrently thereinto a gas stream containing approximately 95% mixed i-$C_7$, 4% n-$C_7$ and 1% aromatics. This gas stream was used to simulate repressurization with a portion of the effluent or non-internally adsorbed gas stream from adsorption. The bed was then ready for another cycle.

The bed was passed through the steps outlined above for many cycles. This process had a normals hydrocarbon recovery of 100% but the hydrocarbon stream recovered during the vacuum desorption only had a normals purity of 34.9%.

The same calcium zeolite A column was passed through the identical process steps and under the same conditions as used above except that a cocurrent purge gas stream comprising essentially methane was passed through the bed after adsorption and before countercurrent desorption. The methane was at adsorption step temperature and pressure, i.e., 707° F. and 35 p.s.i.g., and was passed through at the rate of 9 standard cubic feet per hour (s.c.f.h.) for 45 seconds. This process afforded a normals hydrocarbon recovery of 99% at a purity of 55.1%. It may be seen the purity of the desorbate stream increased by over 20% by use of the present invention.

A thermocouple near the effluent end of the bed did not register a temperature rise at the end of the purge step. However, it was apparent from the succeeding Example II that the temperature rise was imminent, as it was there observed under identical purging conditions.

EXAMPLE II

The same feed gas stream and column of Example I were used to further illustrate the advantages of the invention. The process steps of two different runs are outlined in the following table:

|  | Run 1 | | | Run 2 | | |
|---|---|---|---|---|---|---|
|  | Conditions | Time | Rate (Liquid to Vaporizer) | Conditions | Time | Rate (Liquid to Vaporizer) |
| Adsorption | 707° F. at 35 p.s.i.g. | 4 min. 10 secs. | 12.3 cc./min. | 707° F. at 35 p.s.i.g. | 3 min. 30 secs. | 12.3 cc./min. |
| Cocurrent Purge | None | None | | 707° F. at 35 p.s.i.g. | 45 secs. | 9 s.c.f.h. (gas). |
| Cocurrent Depressurization | Down to 1 atm. | 1 min. | | Down to 1 atm. | 1 min. | |
| Countercurrent Vacuum Desorption | Down to 25 mm. Hg. | 5 min. | | Down to 25 mm. Hg. | 5 min. | |
| Countercurrent Purge | At 25 mm. Hg. | 4 min. 50 secs. | 0.08 s.c.f./cycle (gas) | At 25 mm. Hg. | 6 min. 30 secs. | 1 s.c.f.h. (gas). |
| Countercurrent Repressurization | To 35 p.s.i.g. | 40 secs. | 21.4 cc./min. | To 35 p.s.i.g. | 40 secs. | 21.7 cc./min. |

Both the cocurrent and countercurrent purge gas streams comprises methane and the repressurization gas was identical to that used in Example I. Adsorption time in Run 1 was longer than Run 2 since the adsorption front could be moved further toward the exit end of the bed. This was possible since no cocurrent purge was passed through the bed during Run 1. The cocurrent purge moves the adsorption front further toward the exit end of the bed.

The distribution of the feed stream components in the various product fractions and the overall results of these two runs are tabulated below:

|  | Adsorption | Cocurrent Purge | Cocurrent Depressurization | Countercurrent Vacuum Desorption ($CH_4$ removed) | Countercurrent Purge ($CH_4$ removed) |
|---|---|---|---|---|---|
| Run 1: | | | | | |
| Normals (vol. percent) | 0.4 | None | 0.8 | 53.6 | 75.0 |
| Aromatics (vol. percent) | 9.5 | | 6.4 | 6.9 | 0.8 |
| Cyclics, isomers, etc. (vol. percent) | 90.1 | | 92.8 | 39.5 | 24.2 |
| Run 2: | | | | | |
| Normals (vol. percent) | 1.3 | 5.6 | 4.0 | 69.2 | 90.2 |
| Aromatics (vol. percent) | 4.4 | 18.0 | 12.8 | 1.9 | 0.6 |
| Cyclics, isomers, etc. (vol. percent) | 94.3 | 76.4 | 83.2 | 28.9 | 9.2 |

RECOVERY OF NORMALS

| | Overall recovery of feed normals, percent | Individual |
|---|---|---|
| Run 1 | 98.5 | 63.5 vol. percent at a purity of 53.6% (vacuum desorption), 36.5 vol. percent at a purity of 75.0% (at countercurrent purge); thus overall purity of 61.5%. |
| Run 2 | 81 | 46.7 vol. percent at a purity of 69.2% (vacuum desorption), 53.3 vol. percent at a purity of 90.2% (at countercurrent purge); thus overall purity of 80.4%. |

In Run 1, the countercurrent methane purge results in a $\lambda/\pi$ value of 0.017. In Run 2, the thermocouple near the effluent registered a temperature rise of 4° C. indicating that the purge was terminated after breakthrough.

The $\lambda/\pi$ value for the countercurrent purge was 0.022.

The distribution of the feed stream components in the various product streams are tabulated below as weight percentages:

| | Adsorption | Cocurrent Purge | Countercurrent Depressurization | Countercurrent Vacuum Desorption ($n\text{-}C_5$ removed) | Countercurrent Purge ($n\text{-}C_5$ removed) |
|---|---|---|---|---|---|
| Normals | 0.6 | 0.9 | 5.5 | 42.6 | 87.5 |
| Aromatics | 5.7 | 15.9 | 0.0 | 4.6 | 1.0 |
| Cyclics, isomers, etc | 94.7 | 83.2 | [1] [2] 94.5 | 53.8 | 11.5 |

[1] The n-pentane is shown here rather than being included with the normals because n-pentane is not a portion of the feedstock.
[2] Mostly $n\text{-}C_5$.

The total volume this purge gas would occupy at purge conditions is 135 cu. in., and the empty bed volume was 121 cu. in. so that the cocurrent purge was more specifically terminated somewhat less than one bed volume after equilibrium. The countercurrent purge was terminated at a $\lambda/\pi$ value of 0.023, well within the preferred range of 0.01–0.1.

EXAMPLE III

In another example of the present invention, the same column and feed gas stream of Example I were cycled through the following steps:

Adsorption—707° F. at 35 p.s.i.g.—3 minutes, 30 seconds at 12.3 cc./min.
Cocurrent purge—at 35 p.s.i.g.—2 minutes, 30 seconds at 16 cc./min. heated to 707° F.
Countercurrent depressurization—down to 1 atm. in 1 min.
Countercurrent vacuum desorption—down to 25 mm. Hg in 5 min.
Countercurrent purge—20 cc./cyle for 9 min. at 25 mm. Hg heated to 707° F.
Countercurrent repressurization—to 35 p.s.i.g. in 36 secs. at 13.5 cc./cycle heated to 707° F.

The purge stream in this run comprises a normal pentane gas stream. Normal pentane is more strongly adsorbable on Type 5A molecular sieve pellets than methane. The effluent end thermocouple showed a 10° C. rise after 1.2 minutes of the cocurrent purge. The total flow was 370 cu. in. at purge conditions so that $$\left(\frac{1.2}{2.5}\right)\left(370\right)$$

or 177 cu. in. of purge gas were used prior to equilibrium. Since the empty bed volume was 121 cu. in., the cocurrent purge was terminated $$\frac{370-177}{121}$$

or about one and one-half bed volumes after equilibrium.

*Recovery of normals*

| Overall | Individual |
|---|---|
| 98.5% recovery | 3.3 wt-% at 100% purity (countercurrent depressurization) |
| | 26.0 wt-% at 42.6% purity (vacuum desorption) |
| 76.5% purity | 70.7 wt-% at 87.5% purity (countercurrent purge) |

However, the vacuum desorbate stream is essentially at the concentration of the feed. Thus, if this stream is recycled to the feed gas stream the recovery of the process would decrease by about 11% to about 87% but the overall purity of the recovered normals would be about 90%. An examination of this example illustrates the preference in the present process for using a relatively strongly adsorbable molecule as the purge gas. It may be seen from the data that most of the aromatics which are tenaciously held by the bed are removed during the cocurrent purge step.

In another embodiment of the present invention, the light end of the normal hydrocarbons in the feed gas stream may be utilized. Thus, if the feed gas contained $n\text{-}C_{10}$–$n\text{-}C_{16}$, the purge gas could comprise a rought cut from a distillation of the desorbate gas stream, such as the $n\text{-}C_{10}$–$n\text{-}C_{12}$ cut. The normals could be recycled as the purge gas stream thus illustrating the use of a less strongly absorbed component of the feed as the purge gas. In this embodiment, it is preferred to always maintain the leading adsorption front, which is now the purge gas adsorption front at least partially within the bed during the steps prior to the recovery of the desorbate stream.

EXAMPLE IV

In an example of the use of the present invention; a continuous system for the recovery of normal paraffins from a feed gas stream is provided. A three bed system is provided for this continuous operation. Each bed contains about 121,300 lbs. of Linde Type 5A ⅛ inch molecular sieve pellets. The process is based on the following feed conditions and product specifications:

Feed: Crude distillate at ambient temperature and pressure having a $C_{10}$–$C_{15}$ content and a boiling range of about 382–514° F.

Composition:                                Vol. percent
- $n$-$C_9$ _____ 0.1
- $n$-$C_{10}$ _____ 1.2
- $n$-$C_{11}$ _____ 5.4
- $n$-$C_{12}$ _____ 7.3
- $n$-$C_{13}$ _____ 7.0
- $n$-$C_{14}$ _____ 6.9
- $n$-$C_{15}$ _____ 6.3
- $n$-$C_{16}$ _____ 0.7
- $n$-$C_{17}$ _____ 0.1
- Aromatics _____ 11.0
- Other hydrocarbons _____ 54.0
- Olefins _____ 0
- Sulfur _____p.p.m__ 325
- Nitrogen _____p.p.m__ 7

Normal paraffin product:
  Composition, vol. percent—
    n-Paraffins _____ 95
    Other _____ 5
Feed rate: 12.9 barrels/cycle.

The feed stream is pressurized to 50 p.s.i.a., heated to about 725° F. and then passed to a first bed. The normal paraffins are selectively adsorbed and the unadsorbed hydrocarbons leave the bed and are directed through an isomer product surge drum to condensation and recovery. After a predetermined time, the feed is stopped and is directed to a second bed which has just completed a countercurrent repressurizaton step.

The bed which has just completed the adsorption step is next cocurrently purged at adsorption pressure and temperature with a recycle n-pentane gas stream. This purge sweeps residual isomers and aromatics from the bed. Since the n-pentane is internally adsorbed by the molecular sieve but less strongly adsorbed than the heavier normal paraffins already internally adsorbed on part of the bed, a new n-pentane adsorption front forms forward of the leading n-$C_{10}$ adsorption front left in the bed during absorption. The purge is continued at least until the n-pentane front breaks through the other end of the bed and reaches substantial equilibrium. The material removed during this entire period, largely feed isomers and aromatics, are also directed through the isomer product system. The bed which has now completed the cocurrent purge step is then countercurrently repressurized to about atmospheric pressure. The material removed from the bed during this step is largely pentane with a small quantity of feed hydrocarbons having a normals concentration part way between the feed and desorbate gas streams. A rough split of this stream is made by partial condensation and the normal pentane directed to a recycle pentane storage tank while the feed hydrocarbons are recycled to a fresh feed gas stream.

The bed is then countercurrently vacuum depressurized to 0.5 p.s.i.a. When the bed reaches 0.5 p.s.i.a., the bed is countercurrently purged with n-pentane The material removed during these steps is passed through a desorbate recovery system wherein the stream is split by distillation into a normal paraffins product stream and a recycle n-pentane stream.

After the bed has completed desorption, the bed is repressurized by a combination of isomer product and fresh feed. The first portion of repressurization is accomplished with material from the isomer product surge drum recovered during a previous adsorption step by pressure equalization. The remainder of repressurization is by the feed gas stream during the initial stages of adsorption.

The three bed system is operated as a continuous process by cycling each bed through the steps outlined about as shown in the following table:

Time—Minutes

| | 0–3 | 3–4 | 4–4.5 | 4.5–5 | 5–7 | 7–9 |
|---|---|---|---|---|---|---|
| Bed 1 | Adsorption | Co-current Purge | Countercurrent Depress. | Countercurrent Vacuum Desorpt. | Countercurrent Vacuum Purge | Repressurization |
| Bed 2 | Cocurrent Purge / Countercurrent Depress. / Countercurrent Vacuum Desorpt. | | | Countercurrent Vacuum Purge | Repressurization | Adsorption |
| Bed 3 | Countercurrent Vacuum Purge | Repressurization | Adsorption | | Cocurrent Purge | Countercurrent Depress. / Countercurrent Vacuum Desorpt. |

EXAMPLE V

In this example, a bed 3.01 inches I.D. by about 62 inches long was packed with 4,769 gm. of Type 5A, ⅛ inch molecular sieve pellets. It was then subjected to repeated cycling at the sequence of operation listed in Table I, the feedstock being the same as used in Example I. After steady-state operation had been reached, only 2 wt. percent of the feed normal paraffins were lost in the total effluent during adsorption and cocurrent purging. Details of the effluent-desorbate streams are listed in Table II. It should be noted that based on materials in the feed stream, the combined desorbate removed under vacuum has a n-$C_8$–$C_{17}$ purity of 92.5%.

The cocurrent purge gave a temperature rise of 15° C. at 3 minutes, and the total amount of purge was 0.2 cu. ft. Since the empty bed volume was 0.24 cu. ft., purge was terminated at about one-half bed volume after equilibrium. The countercurrent purge was terminated at a $\lambda/\pi$ value of 0.031.

TABLE I.—SUMMARY OF OPERATING CONDITIONS

| | Material Fed | | | Time, Min. | Temp., °F. | Pressure, p.s.i.a. |
|---|---|---|---|---|---|---|
| | Type | Cc./min. | Direction of Flow | | | |
| Adsorption | C$_8$–C$_{17}$ Hydrocarbons. | 47.2 | Up | 4.0 | a 770±10 | 50 |
| Cocurrent Purge | Technical Grade n-Pentane. | 40.0 | Up | 5.2 | 770±10 | 50 |
| Countercurrent Blowdown | | | Down | 1.2 | 770±10 | 50→~14.7 |
| Countercurrent Vac. Desorption. | | | Down | 5.0 | 770±10 | 14.7→~0.5 |
| Countercurrent Vac. Purge | Technical Grade n-Pentane. | c 83.5 | Down | ~11.5 | 770±10 | ~0.5 |
| Countercurrent Repressurization. | Mixed i-C$_7$'s b | 39.0 | Down | 1.1 | 770±10 | ~0.5→50 | a Feed enters at 770±10° F. A temperature rise of 10-20° F. occurs in the portion of the bed where adsorption is taking place.
b Used to simulate isomer product.
c Total cc.

TABLE II.—SUMMARY OF EFFLUENT-DESORBATE STREAMS

| Steam | Percent of Recovered Normals | Composition (Wt.-Percent) | | | |
|---|---|---|---|---|---|
| | | Feed Normals | Feed Non-normals | n-C$_5$ | Iso-C$_7$'s |
| Countercurrent Blowdown | 1.57 | 2.0 | 0.8 | 96.9 | 0.3 |
| Vacuum Desorption | 23.60 | 19.8 | 4.0 | 74.3 | 1.9 |
| Vacuum Purge | 74.83 | 37.2 | 1.4 | 60.5 | 0.9 |

EXAMPLE VI

A petroleum naphtha feed having a boiling range of 378° F.–516° F. and an API gravity of 42 was processed in accordance with the invention to separate its normal paraffin content which was approximately 25 volume percent of the feedstock. The adsorption bed was 4839 grams of activated calcium zeolite A, clay-bonded pellets contained in a 3-inch I.D. stainless steel tube about 5 feet tall. The feed inlet was passed into the bottom of the bed with adsorption stroke flow upward therethrough. In this example, the upward flow direction is called cocurrent and downward flow is termed countercurrent. The temperature of the molecular sieve bed was raised to 806° F. by means of an electrical heater around the tube, the heater balancing the heat loss of the atmosphere permitting the experiment to run at substantially adiabatic conditions as it would in commercial-scale equipment. The adsorber was pressurized to 25 p.s.i.a. with normal hexane vapor at 806° F. pumped into the chamber in the cocurrent (upward) direction. Cyclic operation was then begun with the following strokes conducted in sequence:

I. *Adsorption stroke.*—Naphtha feed at 190 cc. liquid per minute at 25 p.s.i.a. was heated to 806° F. and passed upward (cocurrent) through the bed for 4 minutes, 15 seconds During this stroke, the normal hydrocarbons were internally adsorbed by the molecular sieve and an effluent comprising branched chain and cyclic hydrocarbons plus displaced n-hexane, which had been preloaded for the start-up, was taken off at the top of the chamber.

II. *Cocurrent purge.*—Normal hexane at 36 cc. liquid per minute at 25 p.s.i.a. was heated to 806° F. and passed upwardly through the bed for 3 minutes and 15 seconds. During this stroke, the non-internally-sorbed feed components were substantially removed from the bed in the top effluent stream, and normal hexane was adsorbed in the molecular sieve to equilibrium saturation at this condition of temperature and pressure. This was shown by a temperature rise of about 14° C. at a thermocouple located close to the top end of the sieve bed after 1.8 minutes. The total purge gas volume was 1.16 cu. ft., and the purge gas flow was terminated about 2.7 bed volumes after equilibrium.

III. *Depressurization.*—The pressure in the adsorption chamber, which was 25 p.s.i.a. during the adsorption and pressure purge strokes, was relieved to atmospheric pressure in a countercurrent direction through the bottom of the bed for a total period of 1 minute. The bottom effluent product was principally composed of normal hexane with some higher boiling normal hydrocarbons and a minor amount of non-normal hydrocarbons.

IV. *Vacuum desorption.*—The pressure in the adsorber was lowered to 0.5 p.s.i.a. by evacuation with a vacuum pump connected to the bottom end of the adsorber with water-cooled and liquid nitrogen refrigerated product traps therebetween The flow direction for this stroke was countercurrent. Seven to eight minutes were required to lower the pressure.

V. *Vacuum purge.*—With the vacuum pump continuing at 0.5 p.s.i.a. from the preceding stroke, normal hexane vapors heated to 806° F. were flowed into the top of the adsorber and drawn countercurrently therethrough for 31 minutes. A total of 380 cc. liquid n-hexane was used in this stroke, and the effluent product was collected in the traps between the adsorber and the vacuum pump. The $\lambda/\pi$ value was 0.12.

VI. *Repressurization.*—The pressure in the adsorber was raised to 25 p.s.i.a. with 20.5 cc. (13.9 grams) of isoheptane pressurized to 25 p.s.i.a., heated to 806° F. and introduced countercurrently.

The amount and composition of the effluent products collected from strokes I through V of the eleventh cycle are given in the table below:

| Stroke | Amount Collected In Grams | Composition in Weight-Percent | | |
|---|---|---|---|---|
| | | C$_{6-8}$ [1] | n-C$_{9-17}$ | i-C$_{9-17}$ |
| I | 2 454.2 | | | |
| II | 65.6 | 36.84 | 4.18 | 58.98 |
| III | 36.1 | 90.2 | 9.01 | 0.79 |
| IV | 42.5 | 43.4 | 55.5 | 1.15 |
| V (a) [3] | 182.2 | 57.6 | 42.0 | 0.43 |
| V (b) [3] | 162.7 | 72.3 | 27.2 | 0.48 |

[1] This is designated C$_{6-8}$ since it is principally the normal hexane and isoheptane purge and repressurization materials. It does contain some lower boiling products of hydrocarbon cracking.
[2] Quantitative analysis not performed on this product because the normal hydrocarbon content is too low for meaningful results.
[3] The effluent product from Stroke V was taken off (a) after 190 cc. of n-hexane was used, and (b) after 380 cc. was used.

The process as described was repeated cyclicly for 11 complete cycles to demonstrate that it was stable and that the products being collected would properly show the capability of the process to yield a normal hydrocarbon product of high purity. It is, of course, to be understood that the lower boiling components having up to 8 carbon atoms may be conveniently removed from the C$_{9-17}$ products by conventional distillation. Upon completion of this 11-cycle run, the molecular sieve adsorbent was removed and found to contain 1.6 to 2.0 weight-percent carbon.

Although the practice of this invention has been described hereinabove with reference to the separation of straight chain hydrocarbons from non-straight chain hydrocarbons it is apparent, in view of the accompanying disclosure, that the invention is also applicable to the separation of other compounds such as the separation of straight chain alcohols from non-straight chain alcohols, more particularly the separation of iso-, secondary, and tertiary alcohols. By employing the practice of this invention n-propanol, n-butanol, n-pentanol, n-hexanol, n-heptanol, n-octanol, n-nonanol, n-decanol and their higher molecular weight homologs may be separated from their corresponding non-straight chain isomers or non-terminal hydroxy (OH) substituted isomers, such as the corresponding iso-, secondary, and tertiary alcohols.

Although particular embodiments of the present invention have been described, it is contemplated that modifications may be made by the art, all within the spirit and scope of the invention.

What is claimed is:

1. A process for separating a feed gas mixture containing molecules capable of being internally adsorbed within a bed of zeolitic molecular sieve from other molecules wherein a portion of said other molecules are non-internally sorbed within said bed which comprises the steps of contacting said feed gas mixture at a first higher pressure with one end of said bed thereby adsorbing the internally adsorbable molecules and withdrawing a gas stream substantially depleted of said internally adsorbable molecules at said first higher pressure; continuing said contact until the leading adsorption front reaches a predetermined location at least partially within the bed; co-currently passing a purge gas stream of an easily removable gas at a pressure at least equal to the sum of the partial pressures of said internally adsorbable molecules in said feed gas mixture and about adsorption temperature in said bed until the purge gas in the effluent stream from the other end of said bed constitutes at least 5 volume percent of said effluent but less than 8 bed volumes after said purge gas has reached equilibrium; depressurizing said bed to a second lower pressure so as to remove only a portion of said easily removable gas and said other molecules from said bed; and further depressurizing said bed to a third lowest pressure thereby removing said internally adsorbable molecules from said bed.

2. A process as described in claim 1 in which the co-current purge is continued at least until the purge gas in the effluent stream from the other end of the bed has reached equilibrium, but less than four bed volumes after said equilibrium has been attained.

3. A process as described in claim 1 in which said bed of zeolitic molecular sieve is depressurized to said second lower pressure in a direction countercurrent to the feed gas flow.

4. A process as described in claim 1 in which said first higher pressure of said feed gas mixture is super-atmospheric.

5. A process as described in claim 1 in which said purge gas is adsorbed by said zeolitic molecular sieve.

6. A process as described in claim 1 in which said purge gas is an adsorbable normal paraffin having at least four carbon atoms per molecule.

7. A process as described in claim 1 in which a purge gas is passed countercurrently through said bed of zeolitic molecular sieve at about said adsorption temperature after the further depressurization step and at said third lowest pressure to further remove said internally adsorbed molecules, the quantity of purge gas being such that $\lambda/\pi$ is between 0.005 and 0.25, where $\lambda$=mols of purge gas per 100 lbs. zeolitic molecular sieve, and $\pi$=purge pressure in p.s.i.a.

8. A process as described in claim 1 in which a purge gas is passed countercurrently through said bed of zeolitic molecular sieve at about said adsorption temperature after the further depressurization step and at said third lowest pressure to further remove said internally adsorbed molecules, the quantity of purge gas being such that $\lambda/\pi$ is between 0.01 and 0.1, where $\lambda$=mols of purge gas per 100 lbs. zeolitic molecular sieve, and $\pi$=purge pressure in p.s.i.a.

9. A process for separating normal paraffins from a hydrocarbon feed stream containing normal paraffins and non-normal hydrocarbons and having an end point up to about 700° F. which comprises the steps of contacting said hydrocarbon feed stream with one end of a bed of zeolitic molecular sieve having a pore size of about 5 Angstroms at a temperature of between about 600° F. and 850° F. and at a first higher pressure thereby adsorbing said normal paraffins in said bed and withdrawing a gas stream substantially depleted of said normal paraffins at said first higher pressure; continuing said contact until the leading normal paraffins front reaches a predetermined location within the bed; co-currently passing a purge gas stream of an easily removable gas at a pressure at least equal to the sum of the partial pressures of said normal paraffins in said hydrocarbon feed stream and about adsorption temperature through said bed at least until said purge gas in the effluent stream from the other end of said bed has reached equilibrium but less than four bed volumes after said equilibrium has been attained; depressurizing said bed to a second lower pressure so as to remove only a portion of said purge gas and said non-normal hydrocarbons from said bed; and further depressurizing said bed to a third lowest pressure thereby removing said normal paraffins from said bed.

10. A process for separating normal paraffins from a hydrocarbon vapor feed stream containing normal paraffins and non-normal hydrocarbons and having an end point up to about 700° F. which comprises the steps of contacting said hydrocarbon feed stream with one end of a bed of zeolitic molecular sieves having a pore size of about 5 Angstroms and at a temperature of between about 600° F. and 850° F. thereby adsorbing said normal paraffins in said bed and withdrawing a gas stream substantially depleted of said normal paraffins at said first higher pressure; continuing said contact until the leading normal paraffins front reaches a predetermined location within the bed; cocurrently passing an adsorbable normal paraffin having at least four carbon atoms per molecule as a purge gas stream at a pressure at least equal to the sum of the partial pressures of said normal paraffins in said hydrocarbon feed stream and about adsorption temperature through said bed at least until said purge gas in the effluent stream from the other end of said bed has reached equilibrium but less than four bed volumes after said equilibrium has been attained; countercurrently depressurizing said bed to a second lower pressure so as to remove only a portion of said purge gas and said non-normal hydrocarbons from said bed; and further countercurrently depressurizing said bed to a third lowest pressure thereby removing said normal paraffins from said bed.

11. A process according to claim 10 in which said first higher pressure is superatmospheric, said second lower pressure is atmospheric, and the third lowest pressure is subatmospheric.

12. A process according to claim 10 in which said purge gas is n-hexane.

13. A process according to claim 10 in which a purge gas is passed countercurrently through said bed of zeolitic molecular sieve after the further depressurization step at about said adsorption temperature and at said third lowest pressure to further remove said normal paraffins, the quantity of purge gas being such that $\lambda/\pi$ is between 0.005 and 0.25, where $\lambda$=mols of purge gas per 100 lbs. zeolitic molecular sieve, and $\pi$=purge pressure in p.s.i.a.

14. A continuous process for separating normal paraffins from a hydrocarbon feed stream containing normal paraffins and non-normal hydrocarbons and having an end point up to about 700° F. which comprises providing at least two beds of zeolitic molecular sieve each having a pore size of about 5 Angstroms; passing each bed through the steps of contacting said hydrocarbon feed stream with one end of a first bed of said zeolitic molecular sieve at a temperature of between about 600° F. and 850° F. and a first higher superatmospheric pressure thereby adsorbing said normal paraffins in said bed and withdrawing a gas stream substantially depleted of said normal paraffins at said first higher pressure; continuing said contact until the leading normal paraffins front reaches a predetermined location within the bed; cocurrently passing a purge gas stream of an easily removable adsorbable gas at a pressure at least equal to the sum of the partial pressures of said normal paraffins in said hydrocarbon feed stream and about adsorption temperature through said bed at least until said purge gas in the effluent stream from the other end of said bed has reached equilibrium but less than four bed volumes after said equilibrium has been attained; depressurizing said bed to a second lower pressure so as to remove only a portion of said purge gas and said non-normal hydrocarbons from said bed; further countercurrently depressurizing said bed to a third lowest subatmospheric pressure thereby removing said normal paraffins from said bed; and countercurrently repressurizing said bed to said first higher pressure at about said adsorption temperature, the steps between said beds being switched so that at least one bed is always on an adsorption step.

15. A continuous process for separating normal paraffins from a hydrocarbon feed stream containing normal paraffins and non-normal hydrocarbons and having an end point up to about 700° F. which comprises providing at least two beds of zeolitic molecular sieve each having a pore size of about 5 Angstroms; passing each bed through the steps of contacting said hydrocarbon feed stream with one end of a first bed of said zeolitic molecular sieve at a temperature of between about 600° F. and 850° F. and a first higher superatmospheric pressure thereby adsorbing said normal paraffins in said bed and withdrawing a gas stream substantially depleted of said normal paraffins at said first higher pressure; continuing said contact until the leading normal paraffins front reaches a predetermined location within the bed; cocurrently passing a purge gas stream of an easily removable adsorbable gas at a pressure at least equal to the sum of the partial pressures of said normal paraffins in said hydrocarbon feed stream and about adsorption temperature through said bed at least until the purge gas in the effluent stream from the other end of said bed has reached equilibrium but less than four bed volumes after said equilibrium has been attained; countercurrently depressurizing said bed to a second lower pressure so as to remove only a portion of said purge gas and said non-normal hydrocarbons from said bed; further countercurrently depressurizing said bed to a third subatmospheric pressure thereby removing part of said normal paraffins from said bed; countercurrently passing a purge gas stream of an adsorbable gas through said bed at about said adsorption temperature and at said third lowest pressure to further remove said normal paraffins, the quantity of purge gas being such that $\lambda/\pi$ is between 0.005 and 0.25, where $\lambda$=mols of purge gas per 100 lbs. zeolitic molecular sieve, and $\pi$=purge pressure in p.s.i.a.; and countercurrently repressurizing said bed at about said adsorption temperature to said first higher pressure, the steps between said beds being switched so that at least one bed is always on an adsorption step.

16. A continuous process for separating normal paraffins from a hydrocarbon feed stream containing normal paraffins and non-normal hydrocarbons and having an end point up to about 700° F. which comprises providing at least two beds of zeolitic molecular sieve each having a pore size of about 5 Angstroms; passing each bed through the steps of contacting said hydrocarbon feed stream with one end of a first bed of zeolitic molecular sieve at a temperature of between about 600° F. and 850° F. and a first higher superatmospheric pressure thereby adsorbing said normal paraffins in said bed and withdrawing a gas stream substantially depleted of said normal paraffins at said first higher pressure; continuing said contact until the leading normal paraffins front reaches a predetermined location within the bed; cocurrently passing an adsorbable normal paraffin having at least four carbon atoms per molecule as a purge gas stream at a pressure at least equal to the sum of the partial pressures of said normal paraffins in said hydrocarbon feed stream and about adsorption temperature through said bed at least until the purge gas in the effluent stream from the other end of said bed has reached equilibrium but less than four bed volumes after said equilibrium has been attained; countercurrently depressurizing said bed to atmospheric pressure so as to remove only a portion of said purge gas and said non-normal hydrocarbons from said bed; and further countercurrently depressurizing said bed to a third lowest subatmospheric pressure thereby removing part of said normal paraffins; countercurrently passing an adsorbable normal paraffin having at least four carbon atoms per molecule as a purge gas stream at about said adsorption temperature through said bed at said third lowest pressure to further remove said normal paraffins, the quantity of purge gas being such that $\lambda/\pi$ is between 0.01 and 0.1, where $\lambda$=mols of purge gas per 100 lbs. zeolitic molecular sieve, and $\pi$=purge pressure in p.s.i.a.; and at least partially countercurrently repressurizing said bed at about said adsorption temperature with the non-adsorbed, normal paraffin depleted gas stream, the steps between said beds being switched so that at least one bed is always on an adsorption step.

17. A process according to claim 16 in which calcium zeolite A is said zeolitic molecular sieve.

18. A process according to claim 16 in which n-pentane is the purge gas employed at said first higher pressure and said third lowest pressure.

19. A process according to claim 16 in which n-hexane is the purge gas employed at said first higher pressure and said third lowest pressure.

20. A process according to claim 16 in which said bed is countercurrently repressurized to about atmospheric pressure with said non-adsorbed, normal paraffin depleted gas stream, and thereafter cocurrently repressurized to said first higher pressure with said hydrocarbon feed stream.

References Cited by the Examiner

UNITED STATES PATENTS

| | | | |
|---|---|---|---|
| 3,176,444 | 4/1965 | Kiyonaga | 55—62 X |
| 3,176,445 | 4/1965 | Collins et al. | 55—62 X |

REUBEN FRIEDMAN, *Primary Examiner.*